United States Patent
Song et al.

(10) Patent No.: US 10,645,403 B2
(45) Date of Patent: May 5, 2020

(54) CHROMA RESHAPING FOR HIGH DYNAMIC RANGE IMAGES

(71) Applicant: Dolby Laboratories Licensing Corporation, San Francisco, CA (US)

(72) Inventors: Qing Song, Sunnyvale, CA (US); Guan-Ming Su, Fremont, CA (US); Qian Chen, San Jose, CA (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/303,028

(22) PCT Filed: May 17, 2017

(86) PCT No.: PCT/US2017/033056
§ 371 (c)(1),
(2) Date: Nov. 19, 2018

(87) PCT Pub. No.: WO2017/201139
PCT Pub. Date: Nov. 23, 2017

(65) Prior Publication Data
US 2019/0320191 A1    Oct. 17, 2019

Related U.S. Application Data

(60) Provisional application No. 62/338,638, filed on May 19, 2016.

(30) Foreign Application Priority Data

May 19, 2016    (EP) .................................... 16170446

(51) Int. Cl.
*H04N 19/30*    (2014.01)
*H04N 19/124*    (2014.01)
(Continued)

(52) U.S. Cl.
CPC ............ *H04N 19/30* (2014.11); *H04N 19/124* (2014.11); *H04N 19/136* (2014.11);
(Continued)

(58) Field of Classification Search
CPC .... H04N 19/30; H04N 19/124; H04N 19/136; H04N 19/186; H04N 19/85; H04N 19/98
See application file for complete search history.

(56) References Cited

U.S. PATENT DOCUMENTS

2018/0007392 A1*   1/2018   Lasserre ............... H04N 19/98
2018/0041759 A1    2/2018   Froehlich
(Continued)

FOREIGN PATENT DOCUMENTS

| EP | 1413985 | 4/2004 |
|---|---|---|
| WO | 2014/130343 | 8/2014 |
| WO | 2017/165494 | 9/2017 |

OTHER PUBLICATIONS

Ramasubramonian, A. "HDR CE2.a-1:Report on LCS" JCT-VC of ITU-T SG 16, 23rd meeting: San Diego, USA, Feb. 19-26, 2016.
(Continued)

*Primary Examiner* — Jonathan R Messmore

(57) ABSTRACT

Methods and systems for adaptive chroma reshaping are discussed. Given an input image, a luma-reshaped image is first generated based on its luma component. For each chroma component of the input image, the range of the pixel values in the luma reshaped image is divided into bins, and for each bin a maximal scale factor is generated based on the chroma pixel values in the input image corresponding to the pixels of the luma reshaped image in the bin. A forward reshaping function is generated based on a reference reshaped function and the maximal scale factors, and reshaped chroma pixel values for the chroma component are generated based on the forward reshaping function and the corresponding pixel values in the luma reshaped image.

(Continued)

Implementations options using look-up tables for mobile platforms with limited computational resources are also described.

14 Claims, 4 Drawing Sheets

(51) Int. Cl.
*H04N 19/186* (2014.01)
*H04N 19/98* (2014.01)
*H04N 19/136* (2014.01)
*H04N 19/85* (2014.01)

(52) U.S. Cl.
CPC ........... *H04N 19/186* (2014.11); *H04N 19/85* (2014.11); *H04N 19/98* (2014.11)

(56) References Cited

U.S. PATENT DOCUMENTS

2018/0278963 A1    9/2018  Schueuer
2019/0124367 A1*   4/2019  Lu .......................... H04N 19/98

OTHER PUBLICATIONS

Minoo, K. et al., "Description of the reshaper parameters derivation process in ETM reference software", 23 JCT-VC Meeting Feb. 19, 2016 to Feb. 26, 2016., San Diego (Joint Collaborative Team On Video Coding of ISO/IEC JTCI/SC29/WG11 and ITU-T SG. 16)., URL: http://wftp3.itu.int/av-arch/jctvc-site/ No. JCTVC-WO031, Jan. 11, 2016.

Lu, Taoran et al., "implication of high dynamic range and wide color gamut content distribution", Optomechatronic Micro/Nano Devices and Components 111: Oct. 8-10, 2007, Lausanne, Switzerland: (proceedings of SPIE, ISSN 0277-786X), spie, Bellingham, wash, vol. 9599, Sep. 22, 2015, pp. 95990B-95990B.

Lee, S. et al., "CE2-related : Report of LumaATF with LCS", 113. MPEG Meeting: Oct. 19, 2015-Oct. 23, 2015: Geneva; (Motion Picture Expert Group or ISO/IEC JTCI/SC29/WG11), No. m37245, Oct. 16, 2015 (Oct. 16, 2015).

Pu, F. et. al., "comments on reshaping for HDR/WCG compression", 113. MPEG Meeting; Oct. 19, 2015 to Oct. 23, 2015, Geneva; (Motion Picture Expert Group or ISO/IEC JTCI/SC29/WG11), No. m37267, Oct. 21, 2015 (Oct. 21, 2015).

Jeroen, S. et al., "chromaticity based color signals for wide color gamut and high dynbamic range" , 110 MPEG Meeting; Oct. 20, 2014 to Oct. 24, 2014; Strasbourg; (Motion Picture Expert Group or ISO/IEC JTCI/SC29/WG11), No. M35065, Oct. 1, 2014 (Oct. 1, 2014).

Ebner, F. et al., "development and testing of a color space (ipt) with improved hue uniformity", Color Science, Systems and Applications: Final Program and Proceedings of IS&T/STD Sixth Color Imaging Conference, IS&T, US, Nov. 1, 1998 (Nov. 1, 1998), pp. 8-14.

ITU-R BT.1886 "Reference Electro-Optical Transfer Function for Flat Panel Displays Used in HDTV Studio Production" Mar. 2011.

SMPTE ST 2084:2014 "High Dynamic Range EOTF of Mastering Reference Displays".

Minoo, K. et al "Exploratory Test Model for HDR Extension of HEVC" ISO/IEC JTC1/SC29/WG11, Geneva, CH, Oct. 2015, N15792.

Ramasubramonian, A.K. et al HDR CE2.a-1: Report on LCS, San Diego, USA, Feb. 2016, ITU-T SG16 WP3.

* cited by examiner

US 10,645,403 B2

CHROMA RESHAPING FOR HIGH DYNAMIC RANGE IMAGES

CROSS-REFERENCE TO RELATED APPLICATIONS

This application claims the benefit of priority to European Patent Application No. 16170446.5, filed May 19, 2016, and U.S. Provisional Application No. 62/338,638, filed May 19, 2016, both of which are incorporated herein by reference in their entirety.

TECHNOLOGY

The present invention relates generally to images. More particularly, an embodiment of the present invention relates to chroma reshaping of images with high dynamic range.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is included herein by reference in its entity, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure relate to any dynamic range higher than SDR.

As used herein, the term "reshaping" refers to a pre-processing operation on an HDR image, such as scaling, quantization, and the like, to map it from its original bit depth to an image of a lower or the same bit depth, to allow for more efficient coding using existing coding standards and devices. 'Forward reshaping' parameters used by an encoder may be communicated to a receiver as part of the coded bitstream using metadata so that a compliant decoder may apply an 'inverse' or 'backward reshaping' operation to reconstruct the original signal at its full dynamic range. Reshaping may be applied to any or all of the color components of an HDR signal. To improve existing and future coding standards, as appreciated by the inventors here, improved techniques for the chroma reshaping of HDR video are needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Chroma reshaping techniques for high dynamic range (HDR) images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to chroma reshaping of HDR images. A processor for adaptive chroma reshaping receives an input image with a luma (luminance) component and one or more chroma components. The processor generates a luma reshaped image based on the luma component of the input image. For a chroma component of the input image, it divides the range of the pixel values in the luma reshaped image into bins, and for each bin it generates maximal scale factors based on the chroma pixel values corresponding to the pixel values of the luma reshaped image in the bin. It generates a forward reshaping function mapping reshaped luma values to chroma scale factors based on a reference reshaped function and the maximal scale factors, and generates reshaped chroma pixel values for the chroma component based on the input chroma pixel values, the forward reshaping function, and the corresponding pixel values in the luma reshaped image.

In another embodiment, the parameters of the forward reshaping function are determined using a lookup table with precomputed parameters of multiple forward reshaping functions. Each of these functions is fully defined by a pair of $(x_T, y_{n*})$ coordinates characterizing a desired crossing point of the forward reshaping function, wherein the $x_T$ coordinate corresponds to a reshaped luma value for which the value of the maximal scale values that are below the reference reshaping function has the maximum distance from the reference reshaping function.

In another embodiment, the reference and forward reshaping functions are functions of the luma pixel values in the input image, and chroma reshaping is performed based on the original luma pixel values and not the pixel values of the luma reshaped image.

Example Video Delivery Processing Pipeline

Figure 1A:
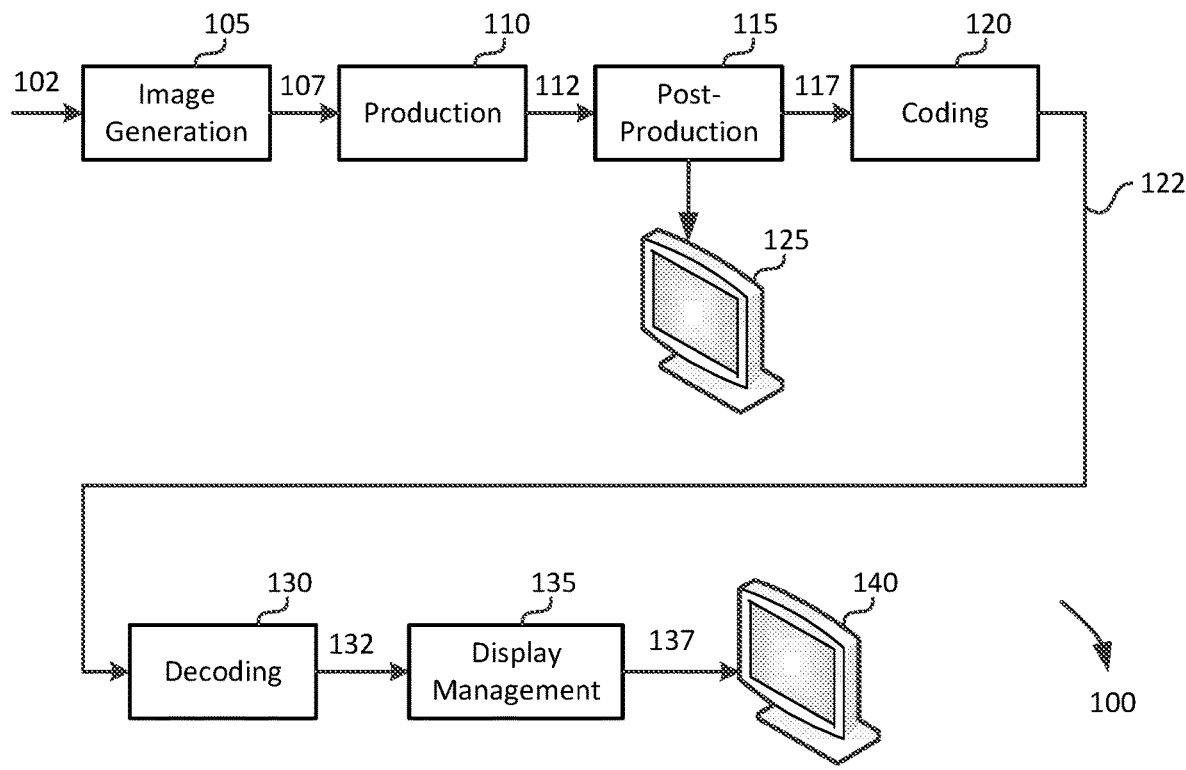
FIG. 1A depicts an example process for a video delivery pipeline.

FIG. 1A depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Reshaping

Currently, most digital interfaces for video delivery, such as the Serial Digital Interface (SDI) are limited to 12 bits per pixel per component. Furthermore, most practical implementations of compression standards, such as H.264 (or AVC) and H.265 (or HEVC), are limited to 10-bits per pixel per component. Therefore efficient encoding and/or quantization is required to support HDR content, with dynamic range from approximately 0.001 to 10,000 cd/m² (or nits), within existing infrastructures and compression standards.

The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays," which is incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidentally may have a very rough similarity to the way the human visual system responds, a PQ curve imitates the true visual response of the human visual system using a relatively simple functional model.

For example, under SMPTE ST 2084, at 1 cd/m², one 12-bit code value corresponds to a relative change of approximately 0.0048 cd/m²; however, at 1,000 cd/m², one 12-bit code value corresponds to a relative change of approximately 2.24 cd/m². This non-linear quantization is needed to accommodate for the non-linear contrast sensitivity of the human visual system (HVS).

Figure 1B:
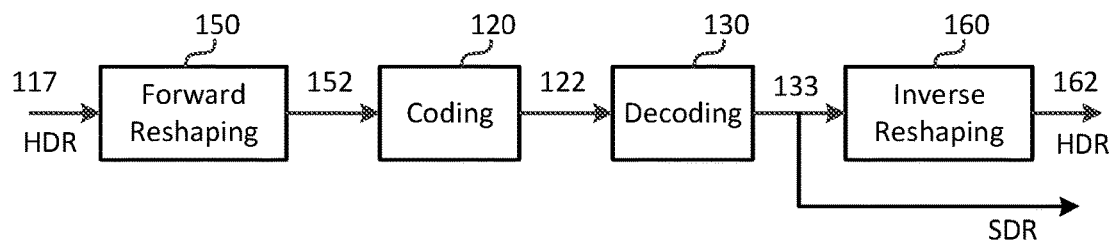
FIG. 1B depicts an example process for data compression using content-adaptive quantization or reshaping according to an embodiment of this invention.

FIG. 1B depicts an example process for content-adaptive reshaping according to an embodiment. Given input frames (117) of an HDR signal, a forward reshaping block (150) analyzes the input and the coding constrains and generates codeword mapping functions which map input frames (117) to re-quantized output frames (152). In some embodiments, forward reshaping (150) may also include processes related to color conversion, tone mapping, and saturation control. For example, input (117), after color conversion, may be gamma-coded or PQ-coded according to certain EOTF. In some embodiments, information about the reshaping process may be communicated to downstream devices (such as decoders) using metadata. Following coding (120) and decoding (130), decoded frames (133) may be processed by a backward or inverse reshaping function (160), which converts the re-quantized frames (133) back to the original EOTF domain (e.g., gamma or PQ), for further downstream processing, such as the display management process (135) discussed earlier. Depending on the transformations of the forward reshaper (150), inverse reshaping (160), may also include additional (inverse) processes, such as inverse tone-mapping, color transformations, and the like. In some embodiments, the backward or inverse reshaping function (160) may be integrated with a de-quantizer in decoder (130), e.g., as part of the de-quantizer in an AVC or HEVC video decoder. In some embodiments, decoded signal (133) may be a backward-compatible SDR signal which can be decoded and viewed by legacy SDR receivers. Hence, while legacy SDR receivers may only view an SDR version of the input (112). HDR receivers may apply inverse reshaping and reconstruct an HDR version (162) of the input.

An example of a signal reshaping function was presented in PCT Patent Application Ser. No. PCT/US2016/020230, filed on Mar. 1, 2016, titled "Content-adaptive perceptual quantizer for high dynamic range images," by J. Froehlich et al., which is incorporated herein by reference in its entirety. Luma and chroma reshaping techniques for HDR images using their corresponding reference SDR images were also presented in U.S. Provisional Application Ser. No. 62/312, 450, "Encoding and decoding reversible production-quality single-layer video signals," by G-M Su et al., filed on Mar. 23, 2016, (also filed as PCT/US2017/023543, on Mar. 22, 2017) which is incorporated herein by reference in its entirety. In this invention, new techniques for chroma reshaping of HDR images, without access to their corresponding SDR images, are presented.

Chroma Reshaping Techniques

Overview

As observed by the inventors, given an HDR video sequence, after luma and chroma reshaping to allow for backward compatibility with SDR decoders, when viewing the reshaped HDR video signal (e.g., 133) on an SDR display, the colors look desaturated or washed out. Intuitively, during the forward reshaping process, one may simply apply a fixed, global, scaling factor to each chroma channel to increase chroma saturation. However, such global scaling yields oversaturated pictures of rather poor visual quality. In document N15792 "Exploratory Test Model for HDR extension of HEVC," by K. Minoo, et al., ISO/IEC JTC1/SC29/WG11, Geneva, CH, October 2015, and in JCTVC-W0101, "HDR CE2.a-1: Report on LCS," by A. K. Ramasubramonian et al., ITU-T SG 16 WP 3 and ISO/IEC JTC 1/SC 29/WG 11, San Diego, USA, February, 2016, chroma reshaping techniques based on the pixel intensity or luma values were proposed; however, even those techniques fail to address the problem of oversaturation.

Let $v_{ji}^y$, $v_{ji}^u$, $v_{ji}^v$, denote the luma (y) and chroma (u, v) components of the i-th pixel of the j-th frame in a HDR input sequence to be reshaped (e.g., 117). Let $\hat{s}_{ji}^y$, $\hat{s}_{ji}^u$, $\hat{s}_{ji}^v$ denote the forward reshaped SDR components (e.g., 152 or 133), and let $\hat{v}_{ji}^y$, $\hat{v}_{ji}^u$, $\hat{v}_{ji}^v$ denote the backward or inverse reshaped EDR components (e.g., 162). All, without loss of generality, normalized between [0 1].

Figure 2:
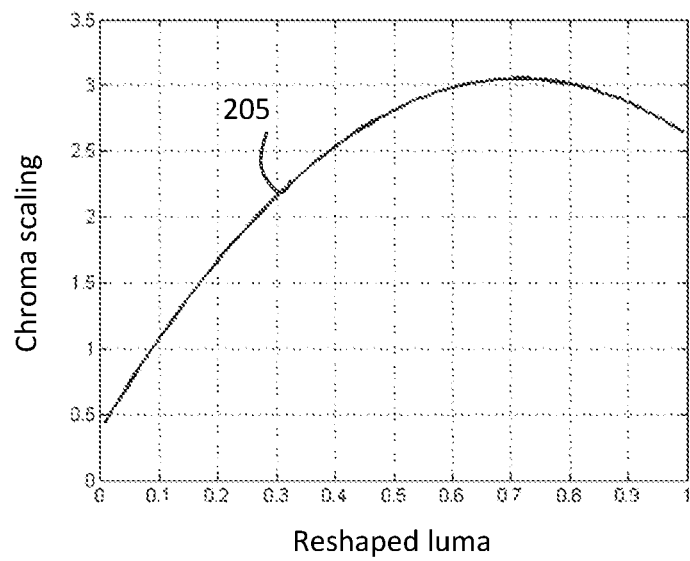
FIG. 2 depicts an example reference chroma reshaping function according to an embodiment of this invention.

Based on a database of multiple test video sequences, according to an embodiment, FIG. 2 depicts an example of a forward chroma reshaping function $f_r(\ )$, to be denoted from now on as the reference reshaping function, which for an input reshaped luma value ($\hat{s}_{ji}^y$) generates a corresponding forward chroma reshaping factor $f_r(\hat{s}_{ji}^y)$. The reference function provides satisfactory results for most video sequences; however, as will be described later on, it may need to be adjusted according to the input content. In practice, this function may be expressed as a polynomial, e.g.:

$$f_r(\hat{s}_{ji}^y) = \sum_{k=0}^{K^F} \alpha_{rk} \cdot (\hat{s}_{ji}^y)^k, \quad (1)$$

where $\alpha_{rk}$, k=0, 1, . . . , $K^F$, denote the coefficients of the polynomial. For example, if $K^F=2$, the graph in FIG. 2 may be approximated using a second-order polynomial. While $f_r(\hat{s}_{ji}^y)$ may be adequate for many frames or scenes in a variety of video sequences, it has been observed that under certain conditions, directly applying $f_r(\hat{s}_{ji}^y)$ may result into oversaturaturation and clipping; hence reshaped chroma values may not be able to be properly reconstructed in a decoder, resulting in reconstructed HDR signals of poor visual quality.

Let $f_j(\hat{s}_{ji}^y)$ denote a forward (invertible) reshaping function to be applied on the j-th frame, In an embodiment, chroma reshaping for the u color component may be expressed as a function of reshaped luma, given by $$\hat{s}_{ji}^u = f_j(\hat{s}_{ji}^y) \cdot (v_{ji}^u - 0.5) + 0.5. \quad (2)$$

Given equation (2), the backward or inverse reshaping can be expressed as $$\hat{v}_{ji}^u = g_j(\hat{s}_{ji}^y) \cdot (\hat{s}_{ji}^u - 0.5) + 0.5, \quad (3)$$

where $$g_j(\hat{s}_{ji}^y) = \frac{1}{f_j(\hat{s}_{ji}^y)} = \sum_{k=0}^{K^B} \beta_{jk} \cdot (\hat{s}_{ji}^y)^k \quad (4)$$

denotes the inverse reshaping function. An encoder may transmit to a decoder parameters related to either the forward or the inverse reshaping functions.

Note that, in equations (2-3) forward and inverse reshaping of chroma values is performed using reshaped luma values. This should not be considered a limitation. All the methods discussed herein are all applicable to generating reshaping functions based on the original, unmodified, HDR luma values ($v_{ji}^y$); however, such methods rely on a decoder being capable of generating unshaped HDR luma values, which may not be the case when the decoder is a legacy SDR decoder.

Let's assume, for now, that function $f_j(\ )=f_r(\ )$. Let the reshaped luma value be 0.8, then from FIG. 2, $f_r(0.8)=3$. From equation (2), for a chroma value of 0.8, $\hat{s}_{ji}^u=3\cdot(0.8-0.5)+0.5=1.4$, which will be clipped to 1. In order to maintain a reversible reshaping function, which allows to fully reconstruct the original HDR chroma values, it is desirable to adapt the $f_r(\ )$ function so that there is no loss of information due to reshaping. Embodiments to properly define $f_j(\hat{s}_{ji}^y)$ based on the image characteristics and the reference reshaping function $f_r(\hat{s}_{ji}^y)$ are described next.

Content-Aware Chroma Reshaping
Determining a Content-Dependent Maximal Scale Factor Consider the reshaped luma values partitioned into M bins of equal width W (e.g., W=1/M). The number of bins (M) is typically dependent on computation resources (e.g., M=64). In each of this bins, it is desirable to identify the t-percentile of the maximal absolute value of ($v_{ji}^u-0.5$), where t, ranging from 0 to 100%, represents the percentage of pixels for which one wants to preserve reversibility. For example, at t=100%, all pixel values will be guaranteed to be reversible; however, such a strong requirement is unnecessary and may affect overall quality. For t=99%, about 1% of chroma information may be lost, which is typically quite acceptable.

For the m-th bin, for m=0, 1, ..., M−1, for all pixels in the original image with reshaped luma values ($\hat{s}_{ji}^y$) in this bin, e.g., with values between $$\left[\frac{m}{M}, \frac{m+1}{M}\right),$$

compute $|v_{ji}^u-0.5|$ for the corresponding chroma values, and compute the t-percentile of these $|v_{ji}^u-0.5|$ values in this bin; let this value be denoted as $b_{j,m}$. This can be expressed as:

$$\Psi_{j,m} = \left\{i \mid \frac{m}{M} \leq \hat{s}_{ji}^y < \frac{m+1}{M}\right\} \quad (5)$$

$$b_{j,m} = \eta \cdot p_t(\{|v_{ji}^u - 0.5| \mid (i \in \Psi_{j,m})\}) \quad (6)$$

where $p_t(x)$ is a percentile function that returns the t-percentile of the values in vector x in the interval [0,100], and $\eta(\eta\leq 1)$ is an optional weighting factor (e.g., t=99%, t=1). For example, in MATLAB, $p_t(x)$ corresponds to the prctile (x, t) function. In practice, using t=100 and a weight $\eta<1$ is equivalent to replacing the $p_t(x)$ function with the maximum (x) function, which is computationally much faster than setting t<100 and $\eta=1$, since for t<100 computing $p_t(x)$ requires sorting data, which involves more computation than simply computing the maximum value of x. In tests, values of $\eta=0.85$ with t=100 yield satisfactory results for a large number of HDR sequences. Given the $b_{j,m}$ values, in an embodiment, the corresponding maximal scale factor is given by $$\tilde{q}_{j,m} = \min\left\{\frac{0.5}{b_{j,m}}, q_{max}\right\} \quad (6)$$

where $q_{max}$ is a value to limit the maximal scale and to avoid infinity if the set $\Psi_{j,m}$ in equation (5) is empty (e.g., $q_{max}=10$). Hence, the set of $\{\tilde{q}_{j,m}\}$ values defines for each bin the maximal scale factor that avoids overflow or underflow of chroma values.

Figure 3:
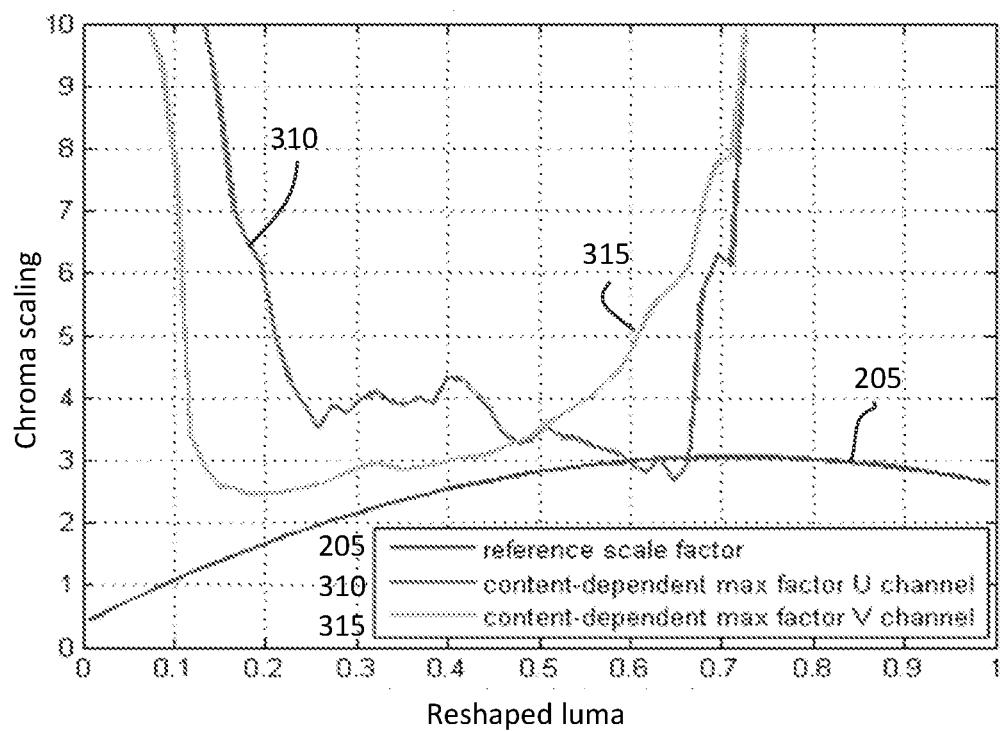
FIG. 3 depicts an example of content dependent, maximal allowable scaling factors according to an embodiment of this invention.

Note that, to simplify notation, neither $b_{j,m}$ or $\{\tilde{q}_{j,m}\}$ are denoted as functions of the u color component (e.g., $b_{j,m}^u$); however, these values may be computed separately for each chroma component, and as depicted in FIG. 3, they may be different.

As an example, FIG. 3 depicts the reference chroma reshaping function (205) and the corresponding maximal scale factors $\{\tilde{q}_{j,m}\}$ (310, 315) as computed for the two chroma components in a test sequence in the YCbCr color format. As depicted in FIG. 3, for certain bins between reshaped luma values in (0.6, 0.7), applying the reference reshaping function on the u channel will lead to clipping.

Given equation (1), let $$r_m = f_r(x_m) = f_t\left(\frac{2m+1}{2M}\right), \text{ for } m = 0, 1, \ldots, M-1, \quad (7)$$

denote the reference scale factor for the m-th bin. Then, in an embodiment, from equations (6) and (7), a set of optimum scale factors is given by:

$$q_{j,m} = \min\{\tilde{q}_{j,m}, r_m\}, \text{ for } m=0,1,\ldots,M-1. \quad (8)$$

Experimental results indicate that using the scaling factors of equation (8) may yield chroma artifacts. It is believed that these artifacts may be due to the irregularity of the $q_{j,m}$ values, which result in sudden changes in the reshaped chroma of neighboring pixel values. In addition, it is a considerable computational challenge to construct the inverse reshaping function based on a set of irregular forward reshaping values. Hence, it is desirable to construct a new forward reshaping function that is both smooth and easily reversible.

Let the new forward reshaping function be denoted $$\tilde{f}_j(\hat{s}_{ji}^y) = \sum_{k=0}^{K^F} \tilde{\alpha}_{jk} \cdot (\hat{s}_{ji}^y)^k, \quad (9)$$

where $\tilde{\alpha}_{jk}$ denote the polynomial coefficients of the new forward reshaping function. This function provides similar scale factor as $\{r_m\}$, and at the same time satisfies the constraint:

$$0 < \tilde{f}_j(x_m) \leq \tilde{q}_{j,m} \text{ for all } m.$$

The output of the new reshaping function should always be greater than 0 to prevent changing the input colors (e.g., to neutral).

In an embodiment, a solution for the optimal $\tilde{\alpha}_{jk}$ coefficients in equation (9) may be derived by minimizing the distance between the desired scaled factor and the reference scale factor, e.g.:

$$\{\tilde{\alpha}_{jk}^*\} = \arg\min_{\{\tilde{\alpha}_{jk}\}} \left(\sum_{m=0}^{M-1} |r_m - \tilde{f}_j(x_m)|^2\right), \quad (10)$$

subject to $$0 < \tilde{f}_j(x_m) \leq \tilde{q}_{j,m} \text{ for all } m.$$

Such a solution yields satisfactory results; however, certain colors may be deemed to be desaturated. In another embodiment, the distance $|r_m - \tilde{f}_j(x_m)|^2$ is multiplied by a weighting factor $w_{j,m}$ based on the number of reshaped luma values in the m-th bin. Let the set of non-empty bins be $$\Omega_j = \{m \mid w_{j,m} > 0\}, \quad (11)$$

where $w_{j,m} = |\Psi_{j,m}|$ denotes the number of reshaped luma pixels in bin m (see equation (5)). Then, from equation (10), the problem can be formulated as an optimization problem $$\{\tilde{\alpha}_{jk}^*\} = \arg\min_{\{\tilde{\alpha}_{jk}\}} \left( \sum_{m=0}^{M-1} w_{j,m} \cdot |r_m - \tilde{f}_j(x_m)|^2 \right), \quad (12)$$

subject to $$0 < \tilde{f}_j(x_m) \le \tilde{q}_{j,m} \text{ for } m \in \Omega_j.$$

Figure 4:
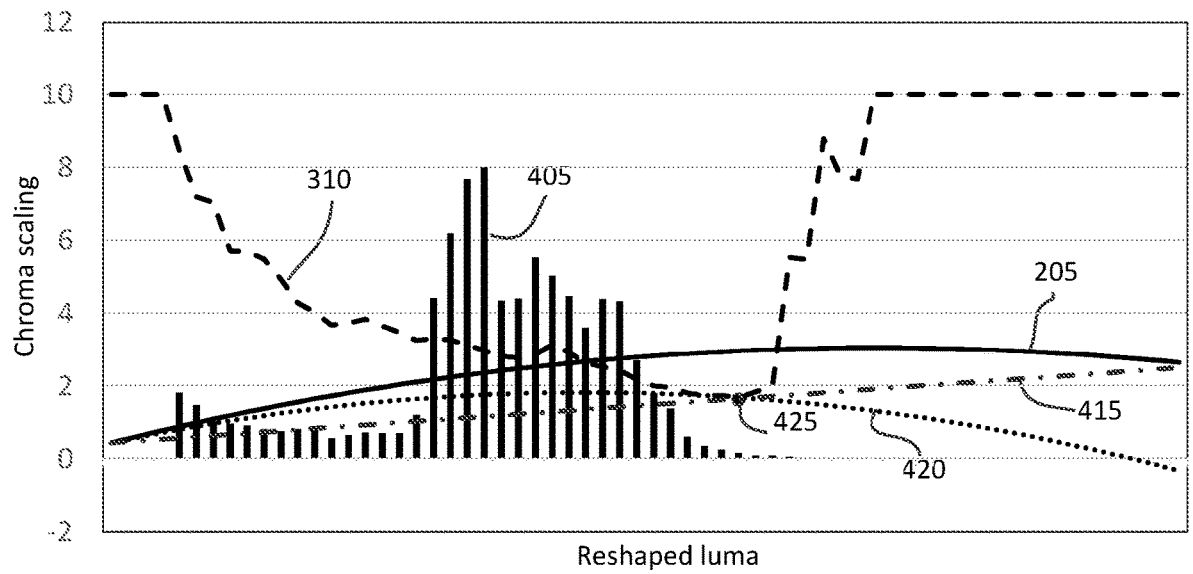
FIG. 4 depicts examples of content-dependent reshaping functions according to embodiments of this invention.

As an example, FIG. 4, depicts the reference reshaping values $r_m$ (205), the $\tilde{q}_{j,m}$ values (310) for one of the chroma components, the corresponding weights $w_{j,m}$ (405), computed based on the computed histogram, the reshaping factors (415) computed using equation (10) and without taking into consideration the weights, and the reshaping factors (420) computed using equation (12) and by taking into consideration the weights.

Fast Method to Determine the Forward Reshaping Function

Given the order of the polynomial $\tilde{f}_j(\ )$, equation (12) may be solved using any known in the art polynomial approximation techniques. For example, in a brute-force mode, if each coefficient may be restricted to be within k values, then, for a second-order polynomial with three unknown coefficients, one can iterate over all $k^3$ values. A faster algorithm to determine the coefficients of the output reshaping function is proposed next.

Let $(x_0, r_0)$ denote the starting point of $f_r(\ )$. Let $(x_T, \tilde{q}_{j,T})$ denote another point in the curve (to be denoted as the second (or B) cross point), where $$T = \arg\min_m (\tilde{q}_{j,m} - r_m). \quad (13)$$

This point coincides with the $\{\tilde{q}_{j,m}\}$ value that is below the reference curve and has the maximum distance from the reference curve. Note that if $(\tilde{q}_{j,m} - r_m)$ is always positive, there is no reason to generate a new $\tilde{f}_j(\ )$ function, one may simply use $\tilde{f}_j(\ ) = f_r(\ )$. As an example, in FIG. 4, the $(x_T, \tilde{q}_{j,T})$ point is depicted as point 425.

Given these two points, for a second order polynomial, the optimization problem in equation (12) may be reduced to determine a single polynomial coefficient, $\tilde{\alpha}_{j2}$. Given $\tilde{\alpha}_{j2}$, the other two coefficients may be derived as:

$$\tilde{\alpha}_{j1} = \frac{r_{j0} - \tilde{q}_{j,T}}{x_0 - x_T} - \tilde{\alpha}_{j2}(x_0 + x_T) \quad (14)$$

$$\tilde{\alpha}_{j0} = r_{j0} - x_0 \tilde{\alpha}_{j1} - x_0^2 \tilde{\alpha}_{j2}$$

In an embodiment, given a range $[-a, a]$ and a step D (e.g., $D=2a/k$), $\tilde{\alpha}_{j2}$ is computed by iterating over all $k+1$ values $-a$, $-a+D$, $-a+2D$, ..., a (e.g., $k=100$, $a=10$), and determining which parameter value yields the minimum weighted mean square error (see equation (12)).

Inverse Reshaping

Given a forward reshaping function $f_j(\ )$ (e.g., $f_j(\ ) = \tilde{f}_j(\ )$ from equation (10) or (12)), an encoder has a variety of options to enable a decoder to apply the inverse reshaping, including:

Transmitting a definition of $f_j(\ )$ (e.g., the polynomial coefficients and its order, $K^F$) and letting the decoder reconstruct its inverse $g_j(\ ) = 1/f_j(\ )$ Generating $g_j(\ ) = 1/f_j(\ )$ and transmitting a representation of $g_j(\ )$, either as a single polynomial or a multi-piece set of second-order polynomials Generating and transmitting look-up tables For example, given M uniformly sampled points between [0 1), let $$\left\{ x_m = \frac{2m+1}{2M} \right\},$$

where $m = 0, 1, \ldots, M-1$. A reshaper unit, may
1. Generate $y_{jm} = f_j(x_m)$ for $m = 0, 1, \ldots, M-1$
2. Generate inverse scaling values $$z_{jm} = \frac{1}{y_{jm}} = \frac{1}{f_j(x_m)}$$

for $m = 0, 1, \ldots, M-1$
3. Perform curve fitting on the samples $\{z_m\}$ to get polynomial of order $K^B$:

$$g_j(\hat{s}_{ji}^y) = \frac{1}{f_j(\hat{s}_{ji}^y)} = \sum_{k=0}^{K^B} \beta_{jk} \cdot (\hat{s}_{ji}^y)^k$$

4. Embed $K^B$ and the $\beta_{jk}$ parameters as metadata together with the reshaped bitstream From equations (3)-(4), in a decoder, the inverse reshaping is given by $$v_{ji}^u = (\hat{s}_{ji}^u - 0.5) \sum_{k=0}^{K^B} \beta_{jk} \cdot (\hat{s}_{ji}^y)^k + 0.5 \quad (15)$$

$$= (\hat{s}_{ji}^u - 0.5) \sum_{k=0}^{K^B} \beta_{jk} \cdot (\hat{s}_{ji}^y)^k + 0.5$$

$$= 0.5 - \sum_{k=0}^{K^B} 0.5 \cdot \beta_{jk} \cdot (\hat{s}_{ji}^y)^k + \sum_{k=0}^{K^B} \beta_{jk} \cdot \hat{s}_{ji}^u \cdot (\hat{s}_{ji}^y)^k.$$

In tests, $K^B = 6$ provided a very good representation. When $K^B > 2$, one may also decide to approximate equation (15) using two or more second order polynomials. Note also, that in equation (15), a chroma component is generated based on both reconstructed luma components ($\hat{s}_{ji}^y$) and cross products between luma and chroma components. As described in U.S. Provisional Application Ser. No. 62/249,474, filed on Nov. 2, 2015, "Layered representation and delivery of high dynamic range video," by Klaas H. Schueuer et al., (filed also as PCT/US2016/059862, on Nov. 1, 2016), which is incorporated herein by reference in its entirety, in some existing HDR decoder implementations (e.g., HDR Dolby Vision decoding offered by Dolby), a prediction function for predicted luma or chroma components may be expressed also as a combination of both luma and chroma values. This representation is referred to as multivariate, multiple regression (MMR) representation. For example, in an embodiment, a third order MMR representation may be expressed as $$v_{ji}^u = m_{j0} + m_{j1}(\hat{s}_{ji}^y) + m_{j2}(\hat{s}_{ji}^y)^2 + m_{j3}(\hat{s}_{ji}^y)^3 + m_{j4}(\hat{s}_{ji}^u) + m_{j5}(\hat{s}_{ji}^u)^2 + m_{j6}(\hat{s}_{ji}^u)^3 + m_{j7}(\hat{s}_{ji}^u \cdot \hat{s}_{ji}^y) + m_{j8}(\hat{s}_{ji}^u \cdot \hat{s}_{ji}^y)^2 + m_{j9}(\hat{s}_{ji}^u \cdot \hat{s}_{ji}^y)^3 \quad (16)$$

where $m_{jk}$, for k=0, 1, . . . , 9, denote the coefficients of the MMR-model.

Given equations (15) and (16), for a given $K^B$ (e.g., $K^B$=3) one can easily solve for the $m_{jk}$ coefficients in terms of the $\beta_{jk}$ coefficients and the reshaped luma and chroma data values. For example, let equation (15) be expressed in a matrix-vector form $$v_j^u = A_{gj} \beta_j, \quad (17)$$

where $v_j^u$ is a P×1 vector of the P pixels in frame j, $A_{gj}$ is a P×($K^B$+2) data matrix, and $\beta_j$ is a ($K^B$+2)×1 vector. Equation (16) can also be expressed as $$v_j^u = A_{mj} m_j, \quad (18)$$

where $v_j^u$ is a P×1 vector $A_{mj}$ is a P×10 data matrix, and $m_j$ are 10×1 vector. Since equations (17) and (18) represent the same reconstructed values, given $\beta_j$, $$m_j = A_j \beta_j, \quad (19)$$

where $$A_j = (A_{mj}^T A_{mj})^{-1} (A_{mj}^T A_{gj}),$$

is a 10×($K^B$+2) matrix.

In practice, computing $A_j$ for every frame may be beyond the capabilities of real-time processing, thus a "semi-fixed" conversion matrix might be used, where, for example, the semi-fixed matrix is temporally updated using running averages of $A_{mj}$ and $A_{gj}$ matrices computed using sampled frames.

Figure 5A:
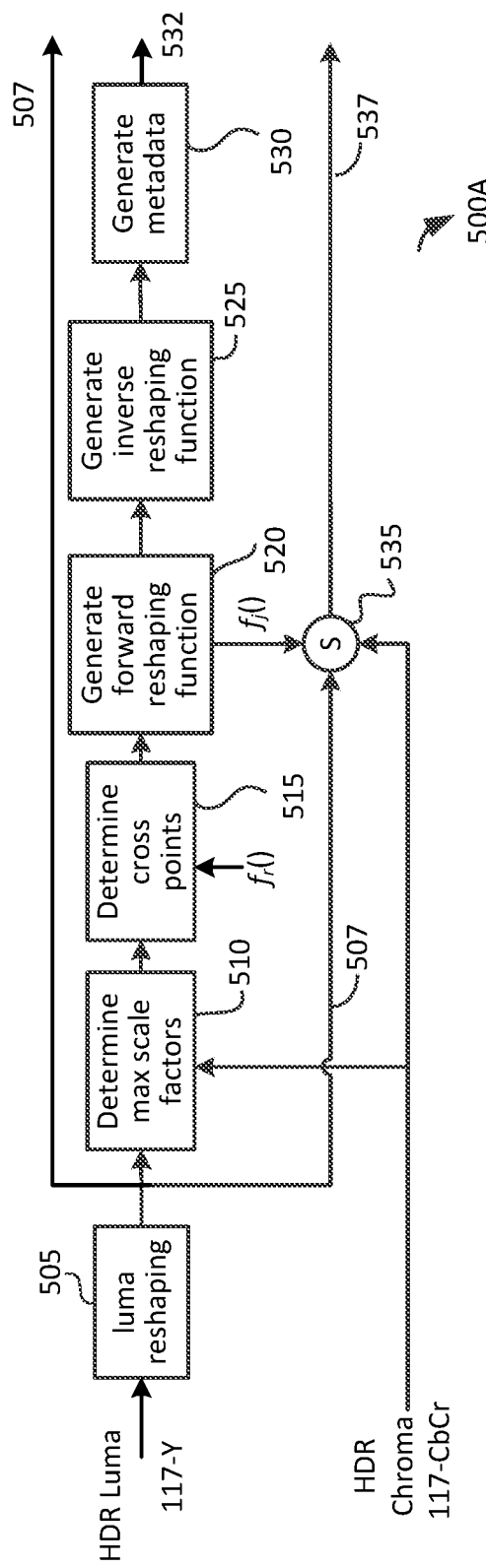
FIG. 5A and FIG. 5B depict example processes of chroma reshaping according to embodiments of this invention.

FIG. 5A provides an example of a chroma reshaping process (500A) according to an embodiment. Given the HDR input (117), after luma reshaping (505), block (510) computes the maximal scale factors $\tilde{q}_{j,m}$ and optionally the luma-based weights $w_{j,m} = |\Psi_{j,m}|$ (e.g., using equations (5-6)). These data are passed to blocks 515 and 520, where, given a reference reshaping function ($f_r()$), a forward reshaping function ($f_f()$) is determined. The forward reshaping function may be computed using any known in the art curve fitting approximation techniques (e.g., using equations (10-12)). Alternatively, a faster, but less accurate, technique using two or more cross points may also be employed.

Given the chroma reshaping function $f_f()$, the chroma reshaped data (537) are generated using reshaping unit (535) (e.g., using equation (2)) as a function of both the input reshaped luma data (507) and the input HDR chroma data (117-CbCr). Using the forward chroma reshaping function $f_f()$, the reshaper (500A), in steps (525) and (530), generates the corresponding inverse reshaping function ($g_f()$). Metadata (532) related to the inverse reshaping function are generated by block (530). The reshaped luma data (507), the reshaped chroma data (537), and the metadata (532), are then passed downstream (e.g., to a video encoder (e.g. 120)) for further processing (e.g., compression).

Mobile Platform

Figure 5B:
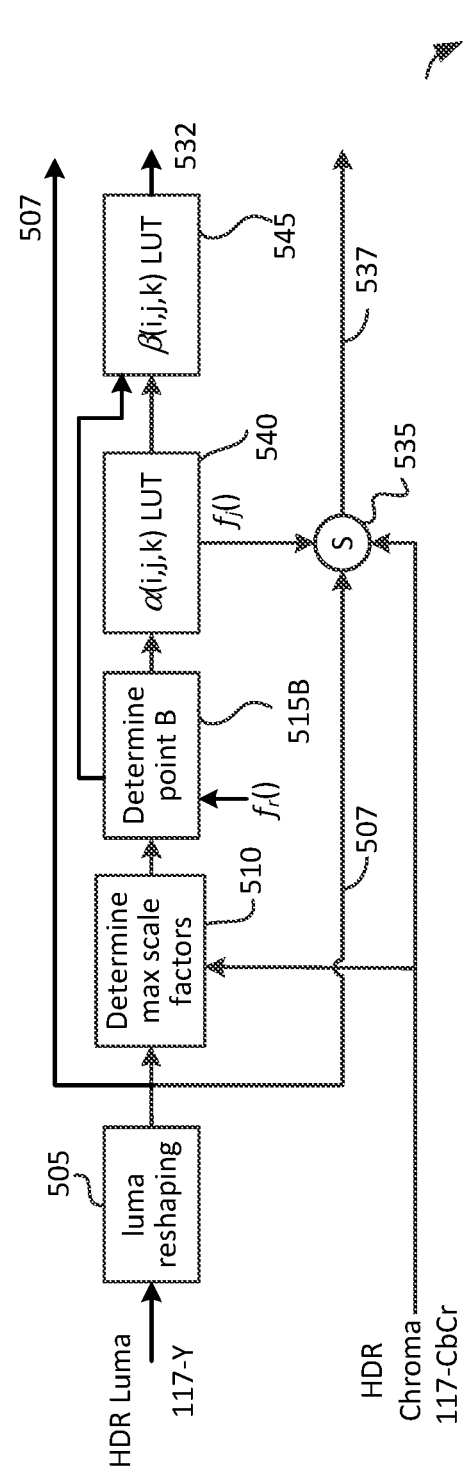

In a mobile platform, such as mobile phone, a tablet, or other portable devices, the computation resources are limited. In an embodiment, as depicted in FIG. 5B, the original chroma reshaping process (e.g., 500A) is modified (e.g., see 500B) to rely as much as possible on pre-computed look-up tables (LUTs) for both selecting the best forward reshaping function (e.g., step 520), and generating the metadata related to the inverse reshaping function (steps 525 and 530).

Figure 6:
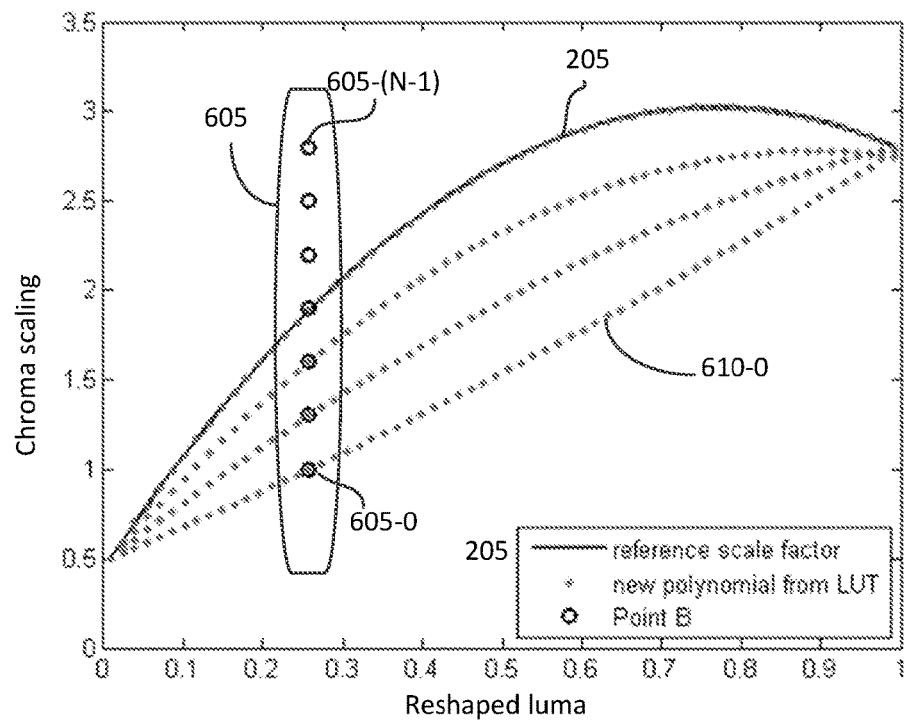
FIG. 6 depicts example chroma reshaping functions that may represented in a forward-reshaping coefficient look-up table (LUT) according to an embodiment of this invention.

As shown in FIG. 2, it is noted that in practice the values of the reference scaling factors $r_m$ are bounded within a range [$r_{min}$, $r_{max}$] (e.g., in [0.49, 3.02]). In practice, the lowest value for $\{\tilde{q}_{j,m}\}$ is never smaller than 1. If $\tilde{q}_{j,m} > r_{max}$, then there is no danger of clipping, and the reference reshaping faction $f_r()$ is always selected. Hence, in practice, the output of the $f_f()$ function is always in the range [1.0, $r_{max}$]. In an embodiment, this range may be quantized into N uniform intervals, with a mid-point value denoted as $y_n$, n=0, 1, 2, . . . , N−1. Let the x-axis of FIG. 2 be represented by M $x_n$ values in [0,1), then each pair ($x_i$, $y_j$), i=0, 1, M−1, and j=0, 1, N−1, may be considered a possible second (B) cross-point (e.g., 425) for the output reshaping function. If such a reshaping function can be expressed using a $K^F$-order polynomial with $\alpha_k$ coefficients (k=0, 1, . . . , $K^F$+1), then one can construct an N×M×($K^F$+1) look-up table representing all possible forward reshaping polynomials. As an example, FIG. 6 depicts the reshaping functions for $x_i$=0.25 (e.g., 610-0), and four different values of $y_j$ (605). Note that no functions are computed for $y_j > f_r(0.25)$.

Hence, to generate look-up table $\alpha(i,j,k)$ (540), the following process may be used:

--- for each $x_i$, $y_j$, n = 0, 1, ..., M−1, j = 0, 1, ..., N−1
   if $y_j > f_r(x_i)$, $\alpha(i,j,k) = \alpha_{r,k}$ //use the coefficients of the ref. reshaping
                                        //function
   else
      $\alpha(i,j,k) = \alpha_{jk}$ // use the coefficients from solving equations (10) or (14)

---

To perform forward reshaping to the input data:
a) generate the x-coordinate of the B crossing point of the current frame j by solving $$T = \arg\min_m (\tilde{q}_{j,m} - r_m). \quad (20)$$

b) Identify the $y_{n^*}$ value (or y-coordinate of the B crossing point) which is nearest to ($x_T$, $\tilde{q}_{j,T}$) in column T:

$$n^* = \arg\min_n |\tilde{q}_{j,T} - y_n|. \quad (21)$$

c) Extract the $K^F$+1 coefficients for the reshaping filter from the coefficient LUT entry as $\alpha(n^*,T,k)$ for all k=0, 1, . . . , $K^F$.

d) Apply the reshaping function $$\hat{s}_{ji}^u = f_j(\hat{s}_{ji}^y) \cdot (v_{ji}^u - 0.5) + 0.5,$$

where $$f_j(\hat{s}_{ji}^y) = \sum_{k=0}^{K^F} \alpha(n^*, T, k) \cdot (\hat{s}_{ji}^y)^k.$$

Given the set of forward reshaping functions used to create the $\alpha(i,j,k)$, one may apply the techniques discussed earlier to generate a corresponding set of inverse reshaping functions, thus generating a corresponding $\beta(i,j,k)$ LUT. Thus, for each B crossing point $(n^*, T)$, the $\beta(i,j,k)$ LUT may output either the $\beta_{j,k}$ or $m_{j,k}$ coefficients.

Thus, for a mobile platform, the chroma reshaping process (500B) includes the following steps:
a) Generate the $\alpha(i,j,k)$ (540) and $\beta(i,j,k)$ (545) look-up tables. These LUTs may be pre-computed off-line or after booting-up the device and are available to the encoder before the beginning of a reshaping process (e.g., capturing and coding an HDR video sequence)
b) Given an input (117), compute $b_{j,m}$ values and corresponding maximal scale $\tilde{q}_{j,m}$ values (see equations (5-6))
c) Determine the second (B) fixed point of the reshaping function; e.g., $(x_T, y_{n^*})$
d) Use point B (e.g., $(x_T, y_{n^*})$) as an index input to the $\alpha(i,j,k)$ LUT to generate the coefficients for the forward reshaping function
e) Apply the coefficients from the $\alpha(i,j,k)$ LUT to do the forward reshaping and generate a chroma reshaped signal (537)
f) Use point B (e.g., $(x_T, y_{n^*})$) as an index to the $\beta(i,j,k)$ LUT to generate the coefficients for the inverse reshaping function; transmit the extracted coefficients for the inverse reshaping function as metadata.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating chroma reshaping of images with enhanced dynamic range, such as those described herein. The computer and/or IC may compute any of a variety of parameters or values that relate to the chroma reshaping processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to chroma reshaping of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient chroma reshaping of HDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In some embodiments, the method may include a step of generating a forward reshaping function based on a reference reshaping function and maximal scale factors. For example, generating the forward reshaping function may comprise adjusting the reference reshaping function using the maximal scale factors. For example, the reference reshaping function may be a predefined function e.g. obtained from a memory or network location.

Various aspects of the present invention may be appreciated from the following enumerated example embodiments (EEEs):
EEE 1. A method for adaptive chroma reshaping with a processor, the method comprising:
    accessing with a processor an input image (117) comprising pixel values in a luma component and one or more chroma components;
    generating a luma reshaped image (507) based on the pixel values of the luma component of the input image;
    accessing a reference reshaping function mapping reshaped luma values to reference chroma scale factors;
    for a chroma component of the input image:
    dividing the range of pixel values in the luma reshaped image into two or more bins;
    generating (510) for each bin a maximal scale factor based on the chroma pixel values corresponding to the pixels of the luma reshaped image in each bin;
    generating (520) a forward reshaping function based on the reference reshaping function and the maximal scale factors, wherein the forward reshaping function maps reshaped luma values to forward chroma scale factors; and
    generating (535) reshaped chroma pixel values (537) for the chroma component based on the chroma pixel values, the forward reshaping function, and the corresponding pixel values in the luma reshaped image.
EEE 2. The method of EEE 1, further comprising:
    generating an inverse reshaping function based on the forward reshaping function;
    generating parameters characterizing the inverse reshaping function; and
    generating and outputting metadata based on the parameters characterizing the inverse reshaping function.

EEE 3. The method of EEE 1, wherein for each bin, for pixels of the luma reshaped image in the bin, the maximal scale factor is computed based on a t-percentile value of a function of the corresponding chroma values in the bin.

EEE 4. The method of EEE 3, wherein for pixel values normalized in [0 1), generating the maximal scale factor for the m-th bin comprises computing $$\Psi_{j,m} = \left\{ i \mid \frac{m}{M} \leq \hat{s}_{ji}^{y} < \frac{m+1}{M} \right\}$$

$$b_{j,m} = \eta \cdot p_t(\{|v_{ji}^{u} - 0.5| \mid (i \in \Psi_{j,m})\})$$

$$\tilde{q}_{j,m} = \min\left\{ \frac{0.5}{b_{j,m}}, q_{max} \right\}$$

where M is the number of bins, $\Psi_{j,m}$ denotes the m-th bin, $\hat{s}_{ji}^{y}$ denotes the i-th pixel in the luma reshaped image, $v_{ji}^{u}$ denotes the corresponding chroma pixel for the chroma component of the input image (j), $\eta$ is a weighting factor, $q_{max}$ is a fixed value, and $p_t(x)$ returns the t-percentile value of the values in vector x in the interval [0, 100].

EEE 5. The method of EEE 4, wherein t=100 and $\eta$ is between 0.85 and 0.95, or $\eta$=1 and t is between 95% and 99%.

EEE 6. The method of EEE 3, wherein generating the forward reshaping function ($\tilde{f}_j(\ )$) for the input image (j) comprises computing $$\{\tilde{\alpha}_{jk}^{*}\} = \arg\min_{\{\alpha_{jk}\}} \left( \sum_{m=0}^{M-1} |r_m - \tilde{f}_j(x_m)|^2 \right),$$

subject to $$0 < \tilde{f}_j(x_m) \leq \tilde{q}_{j,m} \text{ for all } m,$$

wherein M is the number of bins, $\tilde{q}_{j,m}$ denotes the maximal scale factor for the m-th bin, $$r_m = f_r(x_m) = f_r\left(\frac{2m+1}{2M}\right),$$

for m=0, ..., M−1, where $f_r(\ )$ denotes the reference reshaping function, $\hat{s}_{ji}^{y}$ denotes the i-th pixel in the luma-reshaped image, and $$\tilde{f}_j(\hat{s}_{ji}^{y}) = \sum_{k=0}^{K^F} \tilde{\alpha}_{jk} \cdot (\hat{s}_{ji}^{y})^k,$$

where $K^F$ denotes the order of the polynomial of the forward reshaping function.

EEE 7. The method of EEE 6, wherein generating the forward reshaping function ($\tilde{f}_j(\ )$) comprises computing $$\{\tilde{\alpha}_{jk}^{*}\} = \arg\min_{\{\alpha_{jk}\}} \left( \sum_{m=0}^{M-1} w_{j,m} \cdot |r_m - \tilde{f}_j(x_m)|^2 \right),$$

subject to $0 < \tilde{f}_j(x_m) \leq \tilde{q}_{j,m}$, where $w_{j,m}$ are weights.

EEE 8. The method of EEE 7, wherein for the m-th bin, weight $w_{j,m}$ denotes the number of pixels of the luma-reshaped image in the m-th bin.

EEE 9. The method of EEE 7, wherein the forward reshaping function ($\tilde{f}_j(\ )$) is generated based on the starting point of the reference reshaping function and a second point to be crossed by the forward reshaping function, wherein the second point corresponds to the coordinates for which the value of all the maximal scale values that are below the reference reshaping function has the maximum distance from the reference reshaping function.

EEE 10. The method of EEE 9, wherein computing the second point ($x_T$, $\tilde{q}_{j,T}$) comprises computing $$T = \arg\min_{m} (\tilde{q}_{j,m} - r_m).$$

EEE 11. The method of EEE 1, wherein for pixel values normalized in [0 1), generating the reshaped chroma values $\hat{s}_{ji}^{y}$ for the color component (u) of the input image (j) comprises computing:

$$\hat{s}_{ji}^{u} = f_j(\hat{s}_{ji}^{y}) \cdot (v_{ji}^{u} - 0.5) + 0.5,$$

where $f_j(\hat{s}_{ji}^{y})$ denotes the output of the forward reshaping function for pixel $\hat{s}_{ji}^{y}$ in the reshaped luma image, and $v_{ji}^{u}$ denotes the corresponding chroma pixel for the color component of the input image.

EEE 12. The method of EEE 2, wherein the parameters characterizing the inverse reshaping function are generated to match the syntax of a third-order multivariate, multiple regression representation for a prediction function.

EEE 13. The method of EEE 3, wherein generating (520) the forward reshaping function comprises:

computing ($x_T$, $y_{n*}$) coordinates characterizing a desired crossing point of the forward reshaping function, wherein the $x_T$ coordinate corresponds to a reshaped luma value for which the value of the maximal scale values that are below the reference reshaping function has the maximum distance from the reference reshaping function; and generating the polynomial coefficients of the forward reshaping function based on the ($x_T$, $y_{n*}$) point coordinates and a first look-up table comprising polynomial coefficients for a plurality of forward reshaping functions.

EEE 14. The method of EEE 13, wherein computing the ($x_T$, $y_{n*}$) coordinates comprises computing $$T = \arg\min_{m} (\tilde{q}_{j,m} - r_m),$$

where m denotes the m-th bin, $\tilde{q}_{j,m}$ denotes the maximal scale factor for the m-th bin, $$r_m = f_r(x_m) = f_r\left(\frac{2m+1}{2M}\right),$$

for m=0, ..., M−1, where $f_r(\ )$ denotes the reference reshaping function, M denotes the total number of bins, and $$n^* = \arg\min_n |\tilde{q}_{j,T} - y_n|,$$

where $y_n$, for n=1, 2, . . . , N–1, represents the center of the n-th interval, when the range $[1.0, r_{max}]$ is subdivided into N intervals, where $r_{max}$ denotes a maximum of the reference reshaping function.

EEE 15. The method of EEE 13, further comprising:
generating parameters of an inverse reshaping function based on the $(x_T, y_{n^*})$ point coordinates and a second look-up table comprising polynomial coefficients for a plurality of inverse reshaping functions; and
generating and outputting metadata based on the parameters characterizing the inverse reshaping function.

EEE 16. A method for adaptive chroma reshaping with a processor, the method comprising:
accessing with a processor an input image (117) comprising pixel values with a luma component and one or more chroma components;
accessing a reference reshaping function mapping the input luma pixel values to reference chroma scale factors;
for a chroma component of the input image:
dividing the range of the luma pixel values into two or more bins;
generating (510) for each bin a maximal scale factor based on the chroma pixel values corresponding to the luma pixel values in each bin;
generating (520) a forward reshaping function based on the reference reshaping function and the maximal scale factors, wherein the forward reshaping function maps luma pixel values to forward chroma scale factors; and
generating (535) reshaped chroma pixel values (537) for the chroma component based on the chroma pixel values, the forward reshaping function, and the corresponding luma pixel values.

EEE 17. An apparatus comprising a processor and configured to perform any one of the methods recited in EEEs 1-16.

EEE 18. A non-transitory computer-readable storage medium having stored thereon computer-executable instruction for executing a method in accordance with any of the EEEs 1-16.

The invention claimed is:

1. A method for adaptive chroma reshaping of a high dynamic range (HDR) image with a processor, the method comprising:
accessing with the processor an HDR input image comprising pixel values in a luma component and one or more chroma components;
for a chroma component of the input image:
partitioning the pixel values of either the luma component of the HDR input image or a reshaped luma component of the HDR input image into two or more bins;
generating for each bin a maximal scale factor based on the chroma pixel values corresponding to the respective luma or reshaped luma pixel values in each bin;
generating a forward reshaping function based on a reference reshaping function and the maximal scale factors, the forward reshaping function mapping either luma pixel values or reshaped luma pixel values to forward chroma scale factors and correspondingly the reference reshaping function mapping luma pixel values or reshaped luma pixel values to reference chroma scale factors; and
generating reshaped chroma pixel values for the chroma component based on the chroma pixel values, the forward reshaping function, and the corresponding luma pixel values or reshaped luma pixel values of the HDR input image.

2. The method of claim 1, further comprising:
generating an inverse reshaping function based on the forward reshaping function;
generating parameters characterizing the inverse reshaping function; and
generating and outputting metadata based on the parameters characterizing the inverse reshaping function.

3. The method of any preceding claim 1, wherein for each bin, for respective luma pixel values or reshaped luma pixel values in the bin, the maximal scale factor is computed based on a $t^{th}$-percentile value of a function of the corresponding chroma values in the bin; wherein for pixel values normalized in [0 1), generating the maximal scale factor for the m-th bin comprises computing $$\Psi_{j,m} = \left\{ i \,\Big|\, \frac{m}{M} \le \hat{s}_{ji}^y < \frac{m+1}{M} \right\}$$

$$b_{j,m} = \eta \cdot p_t(\{|v_{ji}^u - 0.5| \mid (i \in \Psi_{j,m})\})$$

$$\tilde{q}_{j,m} = \min\left\{\frac{0.5}{b_{j,m}}, q_{max}\right\}$$

where M is the number of bins, $\Psi_{j,m}$ denotes the m-th bin for the HDR input image j, $\hat{s}_{ji}^y$ denotes the i-th pixel of the respective luma component or the reshaped luma component of the HDR input image j, $v_{ji}^u$ denotes the corresponding chroma pixel for the chroma component of the HDR input image j, $\eta$ is a weighting factor, $q_{max}$ is a fixed value, and $p_t(x)$ returns the $t^{th}$-percentile value of the values in vector x, wherein optionally: t=100 and $\eta$ is between 0.85 and 0.95, or $\eta$=1 and t is between 95 and 99.

4. The method of claim 1, wherein generating the forward reshaping function $\tilde{f}_j(\,)$ for the HDR input image j comprises computing $$\{\tilde{\alpha}_{jk}^*\} = \arg\min_{\{\tilde{\alpha}_{jk}\}} \left( \sum_{m=0}^{M-1} |r_m - \tilde{f}_j(x_m)|^2 \right),$$

subject to
$0 < \tilde{f}_j(x_m) \le \tilde{q}_{j,m}$ for all m,
wherein M is the number of bins, $\tilde{q}_{j,m}$ denotes the maximal scale factor for the m-th bin, $$r_m = f_r(x_m) = f_r\left(\frac{2m+1}{2M}\right),$$

for m =0, . . . ,M–1, where $f_r(\,)$ denotes the reference reshaping function, $\hat{s}_{ji}^y$ denotes the i-th pixel of the respective luma component or reshaped luma component of the HDR input image, and $$\tilde{f}_j(\hat{s}_{ji}^y) = \sum_{k=0}^{K^F} \tilde{\alpha}_{jk} \cdot (\hat{s}_{jk}^y)^k,$$

where $K^F$ denotes the order of the polynomial of the forward reshaping function.

5. The method of claim 4, wherein generating the forward reshaping function ($\tilde{f}_j(\ )$) comprises computing $$\{\tilde{\alpha}_{jk}^*\} = \arg\min_{\{\alpha_{jk}\}} \left( \sum_{m=0}^{M-1} w_{j,m} \cdot |r_m - \tilde{f}_j(x_m)|^2 \right),$$

subject to $0 < \tilde{f}_j(x_m) \leq \tilde{q}_{j,m}$, where $w_{j,m}$ are weights for the m-th bin for the HDR input image j.

6. The method of claim 5, wherein for the m-th bin, weight $w_{j,m}$ is proportional to the number of pixel values of the respective luma component or reshaped luma component of the HDR input image j in the m-th bin.

7. The method of claim 5, wherein the forward reshaping function $\tilde{f}_j(\ )$ is generated based on the starting point of the reference reshaping function and a second point to be crossed by the forward reshaping function, wherein the second point corresponds to the coordinates for which the value of all the maximal scale values that are below the reference reshaping function has the maximum distance from the reference reshaping function, and wherein computing the second point $(x_T, \tilde{q}_{j,T})$ comprises computing $$T = \arg\min_m (\tilde{q}_{j,m} - r_m).$$

8. The method of claim 1, wherein for pixel values normalized in [0 1), generating the reshaped chroma values $\hat{s}_{ji}^u$ for the color component (u) of the HDR input image (j) comprises computing:

$$\hat{s}_{ji}^u = f_j(\hat{s}_{ji}^y) \cdot (v_{ji}^u - 0.5) + 0.5,$$

where $f_j(\hat{s}_{ji}^y)$ denotes the output of the forward reshaping function for pixel value $\hat{s}_{ji}^y$ of the respective luma component or reshaped luma component of the i-th pixel of the HDR input image, and $v_{ji}^u$ denotes the corresponding chroma pixel value for the color component of the i-th pixel of the HDR input image.

9. The method of claim 2, wherein the parameters characterizing the inverse reshaping function are generated to match the syntax of a third-order multivariate, multiple regression representation for a prediction function.

10. The method of claim 3 wherein generating the forward reshaping function comprises:

computing $(x_T, y_n^*)$ coordinates characterizing a desired crossing point of the forward reshaping function, wherein the $x_T$ coordinate corresponds to a respective luma pixel value or reshaped luma pixel value for which the value of the maximal scale values that are below the reference reshaping function has the maximum distance from the reference reshaping function; and generating the polynomial coefficients of the forward reshaping function based on the $(x_T, y_n^*)$ point coordinates and a first look-up table comprising polynomial coefficients for a plurality of forward reshaping functions.

11. The method of claim 10, wherein computing the $(x_T, y_n^*)$ coordinates comprises computing $$T = \arg\min_m (\tilde{q}_{j,m} - r_m),$$

where m denotes the m-th bin, $\hat{s}_{j,m}$ denotes the maximal scale factor for the m-th bin, $$r_m = f_r(x_m) = f_r\left(\frac{2m+1}{2M}\right),$$

for m = 0, . . . , M−1, where $f_r(\ )$ denotes the reference reshaping function, M denotes the total number of bins, and $$n^* = \arg\min_n |\tilde{q}_{j,T} - y_n|,$$

where $y_n$, for n = 1, 2, . . . , N−1, represents the center of the n-th interval, when the range $[1.0, r_{max}]$ is subdivided into N intervals, where $r_{max}$ denotes a maximum of the reference reshaping function.

12. The method of claim 10, further comprising:
generating parameters of an inverse reshaping function based on the $(x_T, y_n^*)$ point coordinates and a second look-up table comprising polynomial coefficients for a plurality of inverse reshaping functions; and
generating and outputting metadata based on the parameters characterizing the inverse reshaping function.

13. An apparatus comprising a processor and configured to perform the method according to claim 1.

14. A non-transitory computer-readable storage medium having stored thereon computer-executable instruction for executing a method with one or more processors according to claim 1.

* * * * *